Sept. 5, 1967  K. UTZ  3,339,234
APPARATUS FOR MAKING LAMINATED ARTICLES
Filed Jan. 22, 1965  6 Sheets-Sheet 1

INVENTOR
Kastulus Utz

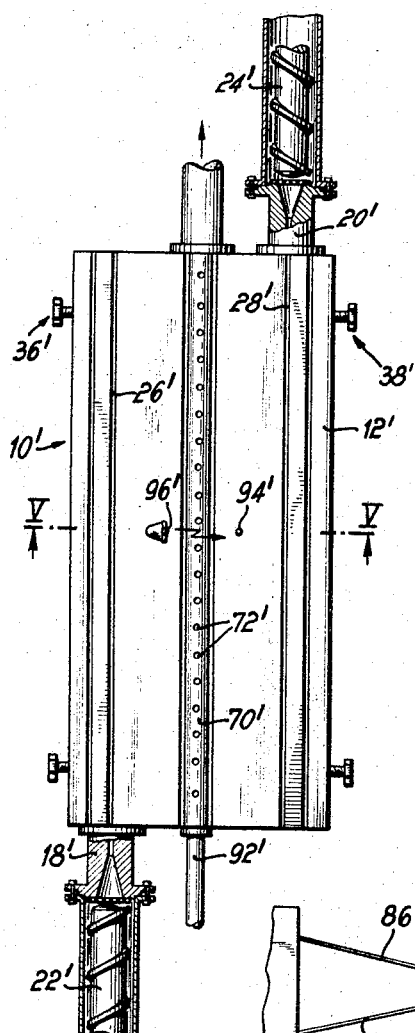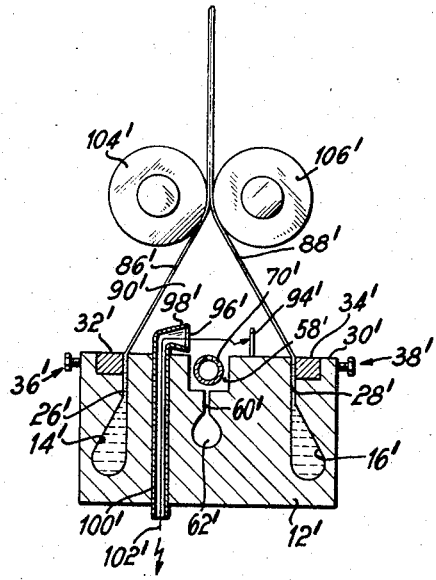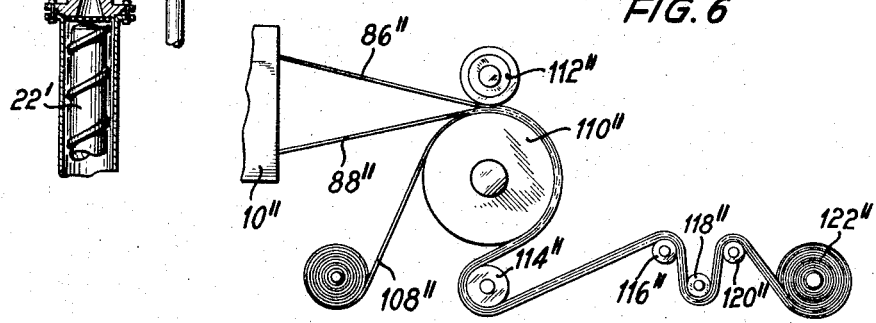

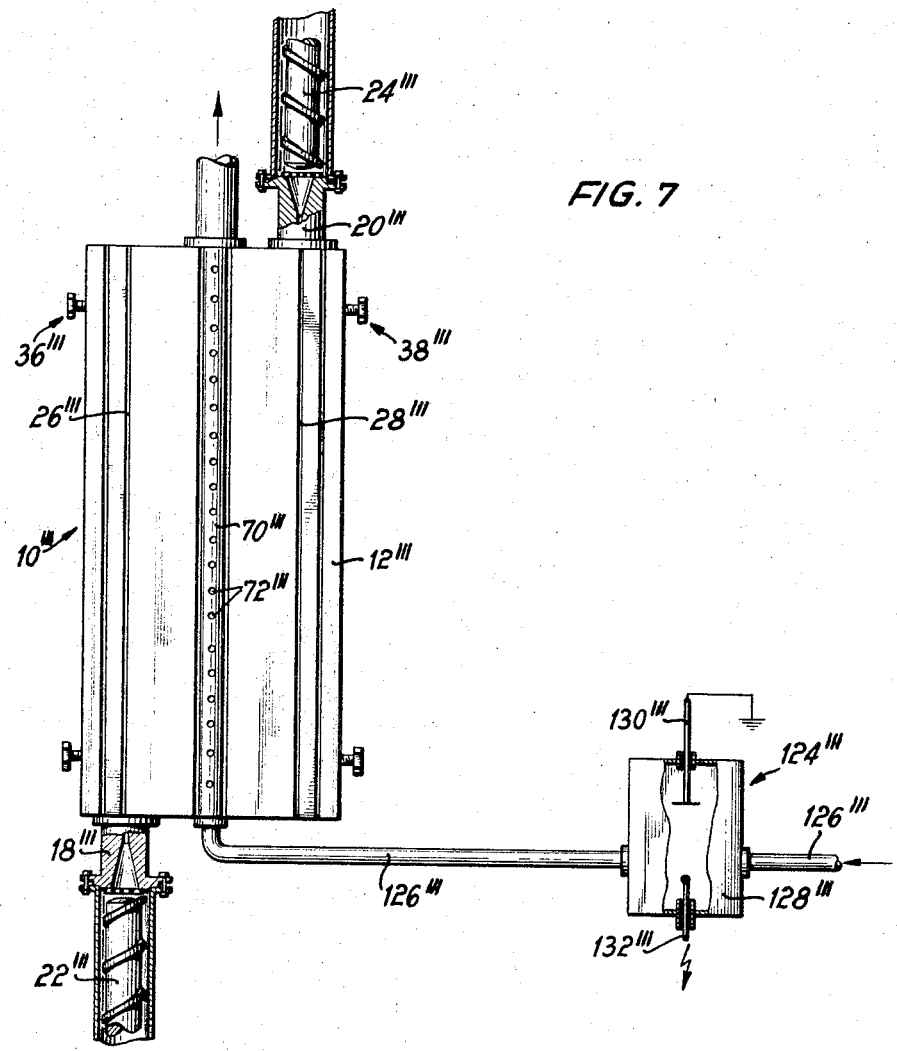

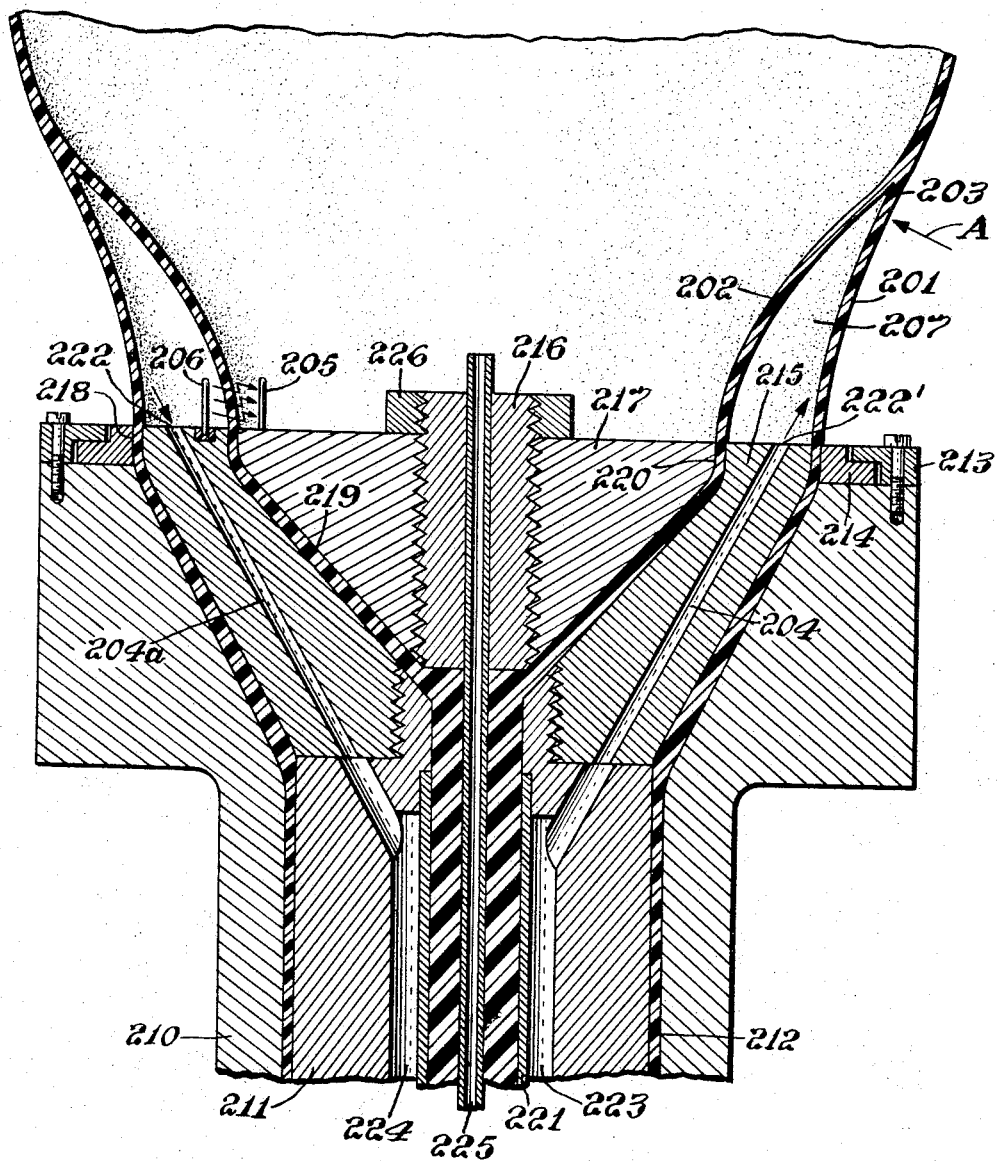

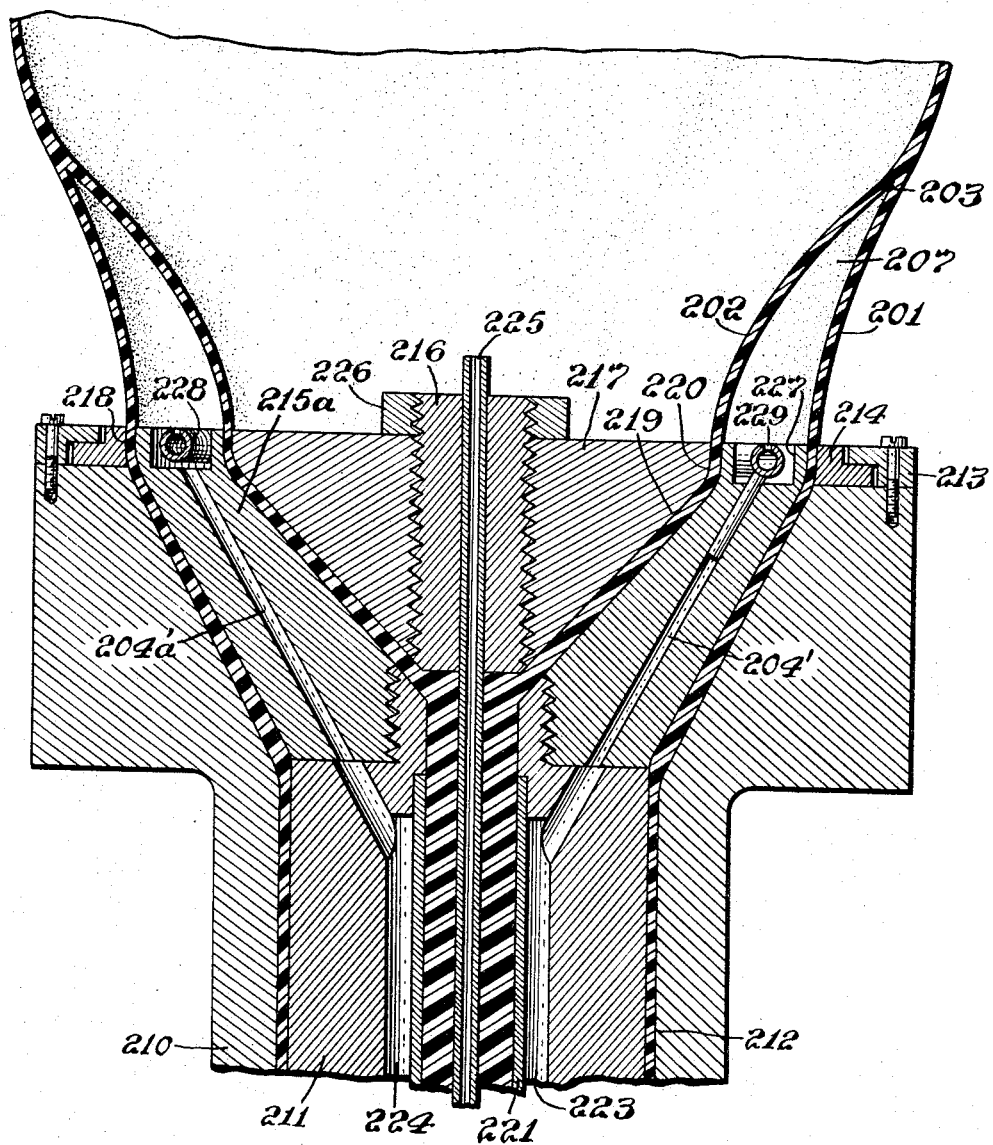

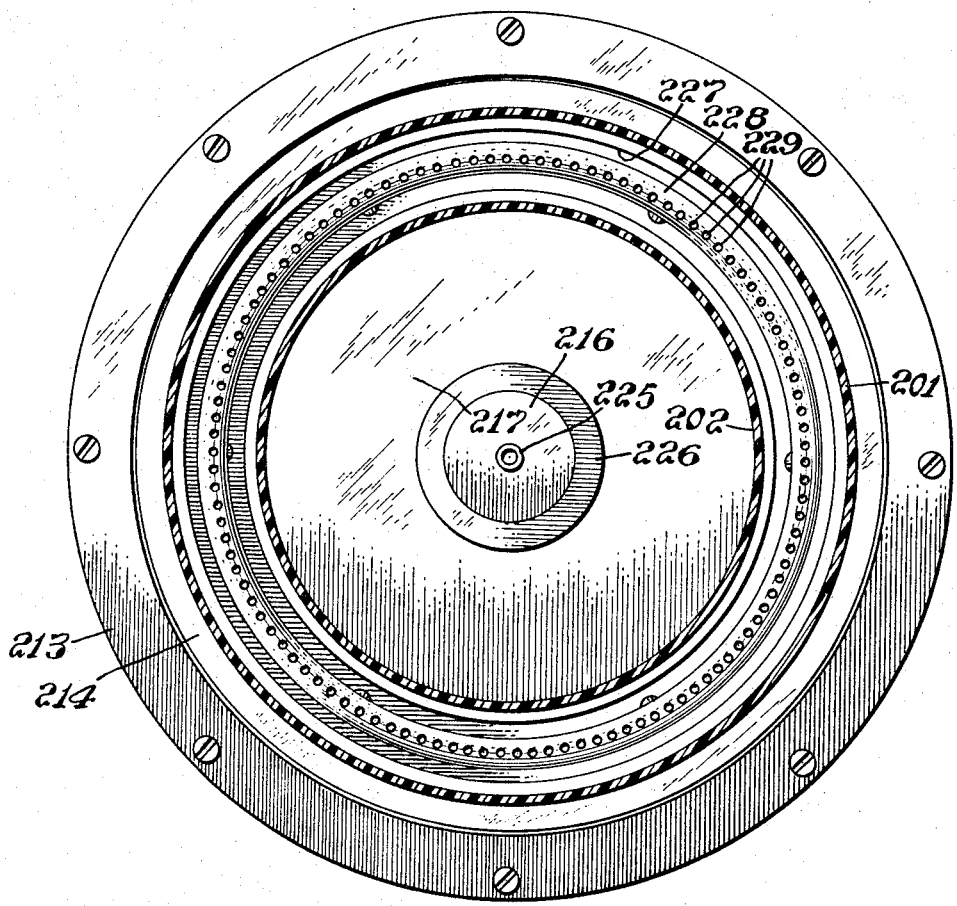

United States Patent Office 3,339,234
Patented Sept. 5, 1967

3,339,234
APPARATUS FOR MAKING LAMINATED
ARTICLES
Kastulus Utz, Freising, Upper Bavaria, Germany, assignor to Multifol Patentverwertungs A.G., Chur, Switzerland, a corporation of Switzerland
Filed Jan. 22, 1965, Ser. No. 427,293
Claims priority, application Germany, Jan. 24, 1964,
A 45,081
10 Claims. (Cl. 18—14)

This application is a continuation-in-part of my copending application Ser. No. 118,313, filed June 20, 1961, now Patent No. 3,184,358.

This invention relates to the extrusion of thermoplastics, and is more particularly concerned with the production of laminated plastic sheets and tubing by simultaneous extrusion of the several layers and bonding thereof immediately upon extrusion.

It is known simultaneously to extrude two or more layers of thermoplastic material through concentric annular shaping orifices of a die and to bond the extruded layers to each other by pressure while hot. The strength of the bond so produced may be quite low if the materials of the two layers are chemically different, and particularly if one of them consists of a substantially non-polar material such as polyethylene.

The primary object of this invention is to generally improve laminated plastic articles such as tubing and sheets, and to provide apparatus for producing such articles.

It is an object of the invention to improve the strength of the bond between the several layers of laminated plastic articles.

A more specific object is the production of laminated plastic sheets and tubing from different plastics which cannot, or cannot readily be bonded to each other by heat and pressure alone, such as polyethylene and nylon.

Another object is the provision of apparatus for producing laminated plastic articles which show low permeability to oil, gases, water vapor, and the like.

This invention is based in part upon the finding that bond strengths between plastic film formations, including sheets and tubing, can be improved by exposing the faces to be bonded to an activating gas when freshly extruded.

Other objects and many of the attendant advantages of this invention will be readily appreciated as the same becomes better understood by reference to the following detailed description when considered in connection with the accompanying drawings in which:

FIG. 4 shows a modified sheet die in a view corresponding to that of FIG. 1;

FIG. 5 shows the die of FIG. 4 and associated apparatus in section on the line V—V;

Figure 1:
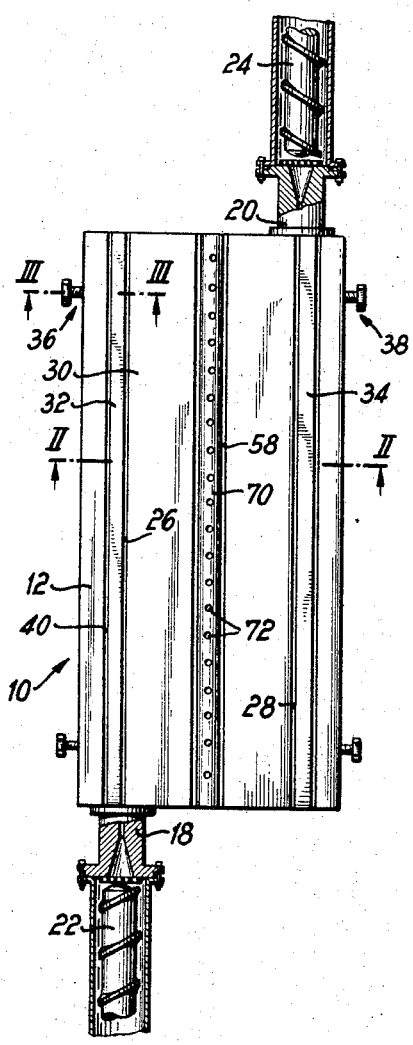
FIG. 1 shows a sheet die of the invention in front view.

FIG. 6 diagrammatically illustrates apparatus for further processing a laminated sheet produced by means of the dies of FIGS. 1, 5, or 7, the view being in side elevation;

FIG. 7 shows yet another modified sheet extrusion die arrangement in a view corresponding to that of FIG. 1;

FIG. 8 shows a tube die assembly of the invention in axial section;

FIG. 9 illustrates another tube die assembly in axial section; and

FIG. 10 shows the die assembly of FIG. 9 in top plan view.

Figure 2:
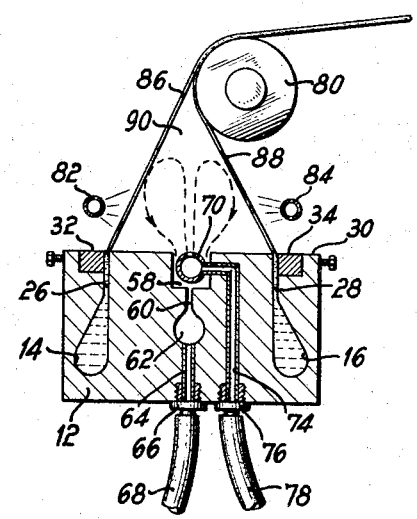
FIG. 2 shows the die of FIG. 1 and associated apparatus in a sectional view taken on the line II—II in FIG. 3.
Figure 3:
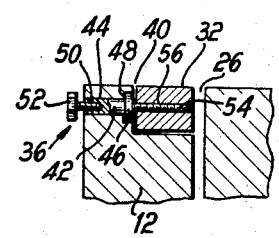
FIG. 3 shows a detail of the die of FIG. 1 in enlarged section on the line III—III.

Referring now to the drawing in detail, and initially to FIGS. 1 to 3, there is seen an extrusion die 10 which mainly consists of an elongated metal body 12 of rectangular prismatic shape. Two parallel longitudinal bores 14, 16 in the body 12 are connected with respective nipples 18, 20 in opposite end faces of the body 12. Screw presses 22, 24 communicate with the nipples 18, 20 for supplying fluid thermoplastic material under pressure to the bores 14, 16.

Elongated slots 26, 28 respectively lead from the bores 14, 16 to the front face 30 of body 12 and extend almost over the entire length of the body in spaced parallel relationship. The longitudinal ends of the slots 26, 28 are sealed by thin integral portions of the body 12, and the longitudinal ends of the bores 14, 16 remote from the associated screw presses are similarly blocked.

Two grooves 40 are formed in the front face 30 laterally adjacent each slot 26, 28, and are longitudinally coextensive with the associated slots. As is seen best in FIG. 3, control bars 32, 34 are arranged in the grooves 40, and may be shifted into the adjacent slots 26, 28 for reducing the effective width thereof. One of the adjusting devices 36, 38 for shifting the bars 32, 34 is shown in detail in FIG. 3.

A stud 42 is rotatably received in a bore 44 of the body 12 which extends from the groove 40 at right angles to the direction of elongation of the groove. The head 46 of the stud 42 is received in a conforming recess 48 provided in a wall of the groove. The free end of the stud 42 has internal threads 50 which are engaged by a normally fixed screw 52. A threaded pin 54 is co-axially attached to the head 46 and extends into a matingly threaded bore 56 of the bar 32. When the accessible head of the screw 52 is turned, the bar 32 moves laterally into or out of the associated slot 26.

Two adjusting devices 36, 38 are longitudinally spaced on each bar 32, 34 and thus permit the effective width of each slot 26, 28 to be varied individually either over the entire length thereof or in such a manner that the width of the slot increases uniformly over the length thereof.

A groove 58 in the front face 30 of the body 12 is parallel to and equidistant from the slots 26, 28. It extends over the entire length of the body 12. The groove 58 is of rectangular cross section and is connected by a slot 60 in its bottom face with a gas exhaust duct 62 provided by a longitudinal bore in the body 12. The slot 60 and duct 62 extend almost over the entire length of the body 12, but are longitudinally closed. A transverse bore 64 connects the duct 62 to a nipple 66 from which a flexible tube 68 leads to an exhaust blower, not shown.

A longitudinally coextensive cylindrical gas distributor pipe 70 is mounted in the groove 58 with clearance from all walls of the groove. Frontal orifices 72 are uniformly distributed over the length of the pipe 70 which is supported on feed pipes 74 that pass through corresponding openings in the body 12 as is seen in FIG. 2. The pipes 74 communicate with nipples 76 and flexible tubes 78 which connect the nipples to a gas storage tank (not shown).

A driven take-off roll 80 is mounted above the extrusion die 10 in such a manner that the longitudinal plane of symmetry of the die is approximately tangential to the roll. Perforated pipes 82, 84 are placed between the extrusion slots 26, 28 and the roll 80 in such a manner as to discharge blasts of cooling air against the individual films or sheets 86, 88 which are respectively discharged from the slots 26, 28 when the screw presses 22, 24 operate. The sheets move in respective planes which are obliquely inclined relative to each other and meet each other at the surface of the roll 80. The sheets are trained over the roll 80 in superposed relationship. The portions of the sheets between the front face 30 and the roll 80 and the central portion of the face 30 enclose an elongated chamber 90 of approximately triangular cross section. The chamber is longitudinally open to the atmosphere. The pipes 82, 84 are arranged outside the chamber 90.

The apparatus illustrated in FIGS. 1 to 3 is operated as follows:

The fluid thermoplastic material extruded from the slots 26, 28 in the shape of flat sheets is at least partly solidified by the air discharged from the pipes 82, 84 against the outer faces of the sheets traveling to the take-off roll 80. The thickness of the sheet may be controlled by laterally shifting the bars 32, 34.

An activating gas is fed to the chamber 90 from the aforementioned tank through the gas distributor pipe 70 at a rate sufficient to permit reaction of the gas with at least one of the inner faces of the sheets 86, 88 to activate the same for subsequent bonding to the other face when the two sheets travel under pressure over the roll 80.

Referring now to FIGS. 4 and 5, there is shown an extrusion die 10′ with associated apparatus which is closely similar to corresponding structure in FIGS. 1 and 3, and corresponding elements have been designated by the same reference numerals as in the first-described apparatus, but primed for the convenience of the reader. A more detailed explanation of substantially identical elements is not needed.

The extrusion arrangement shown in FIGS. 4 and 5 differs from that of FIGS. 1 to 3 by an extension tube 92′ on the gas distributor pipe 70′ which is connected to a source of a gas normally not capable of activating the faces of the plastic sheets 86′, 88′ under prevailing conditions. An electrode 94′ which is grounded through the metal body 12′ faces an insulated electrode 96′ in the chamber 90′. An insulating conduit 100′ passes through a bore in the body 12′ and accommodates a conductor 102′ which connects the electrode 96′ to a source of high electric voltage. The two electrodes define therebetween a discharge gap closely adjacent the orifices 72′ of the distributor pipe 70′. While only a single pair of electrodes has been shown in the drawing for the sake of clarity, it will be understood that rows of electrodes are arranged on opposite sides of the groove 58′ for passing an electrical discharge through the stream of initially inactive gas discharged from the pipe 70′.

Instead of the single take-off roll 80 shown in FIG. 2, the second embodiment of the invention is provided with two rolls 104′, 106′ between which the two sheets 86′ and 88′ are bonded under pressure. The take-off arrangements of FIGS. 2 and 5 are interchangeable.

The electrodes 94′ and 96′ are connected to a source of electrical voltage which produces a corona discharge therebetween. When air is fed to the distributor pipe 70′, the oxygen of the air is partly converted to ozone by the discharge. Ozone is a very much stronger oxidant than molecular oxygen, and produces a strong bond in concentrations much lower than those at which oxygen produces a satisfactory bond under otherwise analogous conditions. The manner of operating the apparatus of FIGS. 4 and 5 will otherwise be evident from Example 1.

FIG. 6 shows how the laminate produced by the devices of FIGS. 1 or 4 may be combined with a carrier which readily bonds to one of the two sheets. The extrusion die 10″ illustrated in FIG. 6 may be identical with any one of the dies described herein in more detail, and discharges sheets 86″ and 88″ of thermoplastic material whose inner faces are modified in the manner described above, but not illustrated in FIG. 6, for bonding to each other. The outer face of the sheet 88′ is bonded to a carrier 108″ when the two sheets 86″, 88″, and the carrier are passed between two take-off rolls 110″ and 112″ while the temperature of the sheet 88″ is still sufficiently high. The laminate, which has three layers, is passed over guide and cooling rolls 114″, 116″, 118″, 120″ to a winding roll 122″.

The apparatus illustrated in FIG. 7 has an extrusion die 10‴ which is closely similar to that illustrated in FIG. 1. Corresponding elements have been identified by triple-primed reference numerals otherwise identical with those of FIG. 1 and will not be further described.

The gas distribution pipe 70‴ is supplied with activating gas through a line 126‴ in which a discharge chamber 124‴ is provided. The chamber has a gastight shell 128‴, a grounded electrode 130‴, and a high tension electrode 132‴ whose lead passes outward through the shell 128‴ in a gastight insulating bushing, not shown in detail. When air or oxygen flows through the line 126‴ while a corona discharge is produced between the electrodes 130‴ and 132‴, a gas enriched with ozone and atomic oxygen is discharged through the pipe 70‴ for activating the inner face of at least one of the plastic sheets discharged from the slots 26‴ and 28‴.

The laminated sheets produced on the devices of the invention described hereinabove may be further processed and shaped in a manner conventional in itself. The method of the invention also may be modified for the extrusion of tubular products, and FIGS. 8 to 10 illustrates apparatus for performing the modified method.

Referring first to FIG. 8, there is shown the cylinder head 211 of a screw press, not otherwise visible in the drawing. A die adapter 210 is fastened to the cylinder head in a conventional manner not shown. Coaxial portions of the adapter 210 and of the head 211 enclose a cylindrical portion of a channel 212 through which a first thermoplastic material is extruded in condition of plasticity. A retaining ring 213 which is bolted to the face of the adapter 210 holds an annular die plate 214 adjacent to the annular orifice 218 of the channel 212 and permits the uniformity of the orifice width to be adjusted by shifting the plate 214. An intermediate die 215 which has the shape of a hollow frustum of a cone is threadedly mounted on an axial extension 216 of the cylinder head 211 which also threadedly carries a conical inner die member 217.

The intermediate die member 215 together with the die adapter 210 defines a conical portion of the channel 212 which connects the aforementioned cylindrical portion thereof with the orifice 218. The inner conical face of the intermediate die member 215 together with the inner die member 217 defines another conically shaped channel 219 which terminates in an orifice 220 concentric with the orifice 218 and of smaller diameter. The channel 219 communicates with an axial bore 221 in the cylinder head through which a second thermoplastic material is extruded separately from the material discharged through the channel 212.

The intermediate die member 215 has several internal ducts 204, 204a which terminate in respective openings 222′ and 222 in the face of the dies between the two shaping orifices 218 and 220. The ducts 204 and 204a respectively communicate with axial channels 223, 224 through which a gas may be respectively admitted to a space adjacent the die face, and withdrawn from that space. The channel 223 serves as the gas-admitting channel while the channel 224 is the exhaust channel.

A tube 225 which extends in the common axis of the several die members enumerated above permits a fluid under pressure sure to be admitted to the space adjacent the center of the face of the dies. It will be appreciated that the lower ends of the channel 212 and the axial bore 221, as viewed in FIG. 8, are connected in the usual manner to extruding spaces in the screw press from which softened plastic is supplied under pressure, and that the lower ends of the channel 223 and tube 225 are respectively connected to pumps or storage containers, not shown, which supply the gas and the pressure fluid, whereas the channel 224 may be vented to the atmosphere or a collecting vessel. While only one duct 204 and one duct 204a are shown in FIG. 8 to lead outwardly from the channels 223, 224, it is preferred to provide several ducts having respective openings 222′, 222 in the annular portion of the die face between the orifices 218 and 220.

The intermediate die member 215 and the inner die member 217 are held in position by a threaded ring 226 mounted on the axial extension 216.

Two electrodes 205 and 206 are respectively mounted on the inner member 217 and the intermediate die member 215. The electrode 206 is insulated from the die member 215, but the electrode 205 is grounded to the metal structure of the extruder. A source of high-frequency alternating potential (not shown) is conductively connected to the electrode to generate a corona discharge between the electrodes as indicated by the arrows.

The afore-described apparatus operates as follows:

Softened thermoplastic material supplied through the channel 212 and the axial bore 221, respectively, is extruded through the orifices 218 and 220 to form two tubular film layers 201 and 202, the inner layer 202 being enclosed within the outer layer 1 and defining therewith an annular space 207. Fluid, such as air, admitted under pressure into the space ahead of the face through the tube 225, expands the inner layer 202 as it moves away from the orifice 220 during extrustion so that it eventually makes contact with the outer layer 201 as shown at 203 where the two layers are bonded together by the pressure of the fluid discharged from the tube 225 since they are still hot and capable of being bonded together.

The apparatus illustrated in FIGS. 9 and 10 is very similar to that shown in FIG. 8. Substantially identical components have been identified by the same reference characters, and will not be described in detail. The difference relates to the manner in which activating gas is admitted to the annular space 207 between the layers 201 and 202.

The intermediate die member 215a is provided with an annular groove 227, and a ring shaped gas distribution tube 228 is mounted in the groove in an arrangement closely similar to that of the pipe 70 in the groove 58 as shown in FIG. 2. The activating gas is fed to the tube 228 through ducts 204' and is released to the space 207 through uniformly spaced apertures 229 in the top surface of the tube 228. Gas is withdrawn from the space 207 through ducts 204'a at the bottom of the groove 227.

The arrangement illustrated in FIGS. 9 and 10 provides more even distribution of activating gas in the space 207 where a rapid stream of gas is needed. It will be appreciated that the admitting passages for the activating gas should be of smaller flow section than the discharge passages open to the atmosphere so that the pressure within the space 207 cannot substantially exceed atmospheric pressure.

The mode of operation of the apparatus shown in FIGS. 1 to 8 is further illustrated by the following examples, but it will be understood that the invention is not limited thereto.

*Example 1*

Nylon (type 66) was fed to the screw press 22 in the apparatus of FIGS. 1 to 3, and was discharged in sheet form from the extrusion slot 26. Simultaneously, polyethylene having a melt index of about 1.5 was extruded through the slot 28 by the screw press 24. Practically pure oxygen was fed through the flexible tube 78 and the distributor pipe 70 to the chamber 90. The oxygen stream was controlled in such a manner that there was outward flow of gas from the longitudinal ends of the chamber 90 while gas was simultaneously exhausted from the chamber through the flexible tube 68.

The die body 12 was held at a temperature of 240° to 260° C. by electric heaters, not illustrated in the drawing. The two extruded plastic sheets had approximately the same temperature at the slots 26, 28 whose length was 300 millimeters. The rate of extrusion from either slot was approximately 400 grams per minute. The thickness of both extruded sheets was approximately 100 microns. Adjustment of the extrusion slot width and variations in the rotary speed of the screw presses 22, 24 permitted the extrusion rate to be varied between 100 and 500 grams per minute with sheet thickness between about 20 and 300 microns.

It was determined experimentally that the bond between the layers of nylon and polyethylene formed on the roll 80 was greatest under the indicated conditions of operation when the stream of oxygen supplied to the chamber 90 was 1500 cubic centimeters per minute as measured at ambient temperature and pressure. Variations in other process variables require adjustment of the oxygen feed rate by trial and error for best results.

Tests of the laminate first obtained showed that bond strength was better in the central portion than nearer the edges. A product of more uniform high bond strength was obtained under otherwise identical conditions when the orifices 72 in the gas distribution pipe 70 near the longitudinal ends of the pipe were somewhat enlarged in a manner not capable of distinct pictorial representation on the scale of FIG. 1, whereby oxygen discharge near the open ends of the chamber 90 was increased. The force required for separating the two layers of a strip of laminate 10 mm. wide was 50 to 80 grams over the entire width of the improved product.

It is believed that the elementary oxygen fed to the chamber 90 produces ether linkages between carbon atoms in the chains of the polyethylene and of the polyamide. The assumption of a chemical reaction between the activating gas and the plastics is supported by the observation that the bond strength between the two layers of the laminate deteriorates in continuous operation unless the gas contents of the chamber 90 are changed more rapidly by exhausting through the groove 58 than would be possible by mere venting through the open ends of the chamber. It is apparently necessary to purge the chamber of the reaction products. The dipole moment of the polyethylene is increased by the reaction.

*Example 2*

Industrially pure oxygen was passed through the chamber 124''' in the apparatus of FIG. 7, and the corona discharge between the electrodes 130''', 132''' was adjusted in such a manner as to maintain an effective ozone concentration of 3 percent in the gas discharged from the orifices 72'''. The mode of operation was otherwise identical with that described in Example 1.

The bond between the polyethylene and polyamide layers was stronger than the polyethylene layer. The samples tested failed in all instance by breaking of the polyethylene.

Ozone is believed to produce carbon-to-carbon bonds between the carbon chains of the nylon and of the polyethylene. A caprolactam polymer (type 6 nylon) gave substantially identical results when bonded to polyethylene by the method of the invention as type 66.

*Example 3*

The procedure of Example 1 was repeated, but oxygen was replaced by technically pure chlorine as the activating gas under otherwise identical condition. Hydrogen chloride was found in the gas discharged from the chamber 90, and there is evidence indicating that chlorine entered the polymer molecules by substitution. It is believed that carbon-to-carbon bonds between the nylon and polyethylene chains were established in the activated bond.

The bond strength was greater than the strength of the polyethylene layer.

*Example 4*

The procedure of Example 1 was repeated on the apparatus of FIGS. 4 and 5, but oxygen was replaced by vapors of styrene (monomer), and a corona discharge was produced in the styrene vapors by a high frequency alternating current fed to the electrodes 94', 95' at high voltage. When the corona discharge was adjusted for optimum intensity by trial and error, the laminate produced failed by rupture within the polyethylene layer when subjected to separation tests.

A weaker, though adequate bond was produced by the styrene vapor even in the absence of the corona discharge. Styrene may be replaced by other polymerizable monomers such as vinyl chloride or butadiene in a manner evident from the preceding description, and analogous results are obtained.

When two layers of polyethylene were bonded to each other by means of vapors of a polymerizable monomer, specifically of styrene, the product had a gas and odor permeability substantially lower than that of the corresponding laminate produced by heat and pressure bonding of the two polyethylene layers in the absence of the monomer. The excellent water vapor permeability characteristics of the polyethylene were not unfavorably affected by the styrene, or other monomer.

It is believed that the vinyl radicals of the styrene form ethylene bridges between carbon atoms of the polyethylene and the nylon in the bonded laminate.

*Example 5*

An apparatus of the type shown in FIGS. 4 and 5 and having extrusion slots 800 millimeters long was supplied with polyethylene and nylon (type 66) at such a rate that respective sheets 30 microns thick were taken off at a rate of 5 meters per minute. Substantially pure oxygen was fed to the chamber 90' at a rate of 1000 liter per hour. An alternating potential of 10,000 volts at 500 cycles per second was applied to the electrodes 94', 96'.

Test strips of the laminate produced having a width of 10 millimeters required application of a force of 45 grams to achieve separation at the bond.

*Example 6*

With an outer nozzle having a diameter of 110 millimeters, and an inner nozzle having a diameter of 80 millimeters, laminated tubes of polyethylene and nylon having diameters between 100 millimeters and 300 millimeters could be produced on the apparatus of FIG. 8. The wall thickness of the individual layers could be varied between 20 and 300 microns, and the mass passing through the nozzle was correspondingly varied between 100 and 500 grams.

Polyethylene was extruded through the inner orifice or nozzle 220, and nylon (type 66) through the outer nozzle 218. Air was injected into the central space enclosed by the polyethylene tubing through the tube 225 for expanding the tubing. Oxygen was continuously fed to the annular space 207 through the ducts 204, and the unreacted excess of oxygen together with the reaction products was continuously exhausted through the ducts 204a. Oxygen flow between 1000 and 2000 cubic centimeters per minute was satisfactory at the indicated rate of plastic extrusion.

The laminated tubing produced by bonding of the polyethylene layer to the nylon layer at 203 was taken off in a conventional manner so that the space defined by the die face and adjacent face portions of the layers 201 and 202 remained sealed.

Typical tubular laminates produced in the manner described had a bond strength of 10 to 100 grams as measured on flat samples 10 millimeters wide. The bond produced without the presence of an activating gas in the annular space 7 was too weak to yield significant test results.

When ozone was formed in the oxygen by a corona discharge between the electrodes 205, 206, the bond between nylon and polyethylene became stronger than the polyethylene. Similar results were obtained when the oxygen was passed through a discharge chamber in the manner evident from FIG. 7, or when ozone produced by thermal decomposition of persulfuric acid was admixed to the oxygen stream. A bond stronger than the polyethylene layer was also formed when chlorine was fed to the space 207 through the ducts 204 and withdrawn through the ducts 204a. When the chlorine introduced through the ducts 204 was increasingly diluted with an inert gas such as nitrogen, the bond strength gradually decreased below the mechanical strength of the polyethylene layer.

The effectiveness of the treatment with chlorine appears to be due to a basic change of the polyethylene surface. When high pressure polyethylene having a specific gravity of 0.918 was extruded through both orifices 218 and 220, the specific gravity of the bonded product was 0.921.

The apparatus shown in FIG. 8 has also been used successfully for bonding two layers of thermoplastic film formations by means of styrene as described in more detail in Example 4. With a corona discharge between the electrodes 205, 206, and with an adequate flow of styrene vapor through the space 207, a bond strength higher than the strength of the polyethylene layer could readily be achieved. The laminated tubing produced had very low permeability to gases, odors, and water vapor. The product obtained without corona discharge had a good bond strength, though not as high as that obtained in the presence of the discharge.

When two layers of polyethylene were bonded in the apparatus of FIG. 8 with the aid of styrene vapors, the permeability of the tubing produced to gases and odors was only one third of the corresponding permeability of a two-layer polyethylene tube bonded by heat and pressure alone. Both products showed the excellent barrier effect against water vapor which is characteristic of polyethylene. Reduced permeability to gases and vapors is also obtained in laminates prepared on the apparatus of FIG. 8 with the aid of other polymerizable monomers such as butadiene and vinyl chloride.

It has been found that bond strength is enhanced by cooling the film formations after activation and prior to contact being established between the film surfaces to be bonded. Such cooling is provided by the air blasts from the tubes 86, 88 in FIG. 1, and by streams of cooling air directed as indicated by the arrow A in FIG. 8. Cooling is believed to prevent air from being trapped between the bonded layers.

Chlorine may be replaced as an activating gas by the other halogens in gaseous or vapor form. Iodine, bromine, and fluorine produced substantially the same improvement in bond strength as chlorine. Laminates of nylon and polyethylene bonded by means of fluorine have exceptionally low permeability to gases, oils, and odors.

Other activating gases which have been found to permit bonding of polyethylene to nylon and other thermoplastics not readily heat bonded to polyethylene, and to improve the permeability characteristics of a laminate produced from two layers of polyethylene include the oxides of sulfur, of nitrogen, and of the halogens, also boron trifluoride and sulfuryl chloride. Because of its relative mild corrosion effects, chlorine is preferred to fluorine where the superior permeability properties due to fluorine are not essential.

Improved bonds between polyethylene and thermoplastic sheet materials other than nylon can be produced by the method of the invention, and polyvinyl chloride, polystyrene, and polyurethane are typical of such other materials. The amounts of ozone, chlorine, or other activating gases required for obtaining the improved bonds are extremely small in some instances.

Obviously, more than two layers of thermoplastic material may be bonded by the method of the invention, and the modification of the apparatus necessary for simultaneously extruding more than two layers, activating their surfaces, and bonding the activated surfaces will readily suggest themselves to those skilled in the art.

The amount of the activating gas to be brought into contact with the plastic faces depends on the rate of extrusion. A higher rate of extrusion reduces the time available for reaction between the activating gas and the plastic material, and calls for an increased rate of gas supply, and/or for a higher concentration of the most reactive ingredient in an otherwise inert or less reactive gas mixture. When the rate of extrusion is increased, the formation of reaction products from the plastic material and the activating gas also is accelerated, and a higher rate of gas flow is desirable for purging the reaction products.

Diluents may be admixed to the reactive agents in the activating gases to improve the purging action. While oxygen enhances bond strength as has been shown hereinabove, it may be considered a diluent when admixed to ozone or fluorine which are more effective activating agents. Although the effects of oxygen and of the more active material are additive, oxygen contributes only a minor share even when predominant in the mixture. Other mixtures of activating agents may be resorted to if desired, and the expected combined results are achieved.

The laminated articles of my invention may be converted to shrinkable sheet or tubing, that is, sheet or tubing which shrinks when heated to its softening temperature. Mechanical strength and permeability features are not lost by the conversion.

Laminated articles of various shapes may be produced from the sheet or tubing on processing equipment which may be conventional in itself, and which may be directly coupled with the extrusion apparatus to receive the laminated material as it is produced.

Laminates of polyethylene and nylon prepared according to this invention combine the desirable properties of both materials. They are as impermeable to water vapor as polyethylene, and as impermeable to oil, odors, and certain gases as nylon. The outstanding electrical properties of polyethylene are combined with the mechanical strength of the nylon.

Obviously many modifications and variations of the present invention are possible in the light of the above teachings. It is therefore to be understood that within the scope of the appended claims the invention may be practiced otherwise than specifically described.

What is claimed is:
1. In an apparatus for producing laminated articles, in combination:
   (a) die means defining two orifices elongated in a common direction, said orifices being spaced from each other transversely of said common direction;
   (b) pressure means for simultaneously extruding two continuous bodies of plastically deformable material from said orifices respectively;
   (c) take-off means for continuously moving the extruded bodies away from said orifices in respective paths terminating in a common portion spaced from said orifices, and for continuously superimposing said bodies in said common portion, each moving body having an inner face spacedly opposite a corresponding inner face of the other body intermediate the respective associated orifice and said common portion, said inner faces and said die means helping define a space between same;
   (d) a source for a gas capable of activating the material of at least one of said bodies;
   (e) feed means for continuously feeding said gas from said source to said space; and
   (f) exhaust means for withdrawing said gas from said space.

2. In an apparatus as set forth in claim 1, said die means including a die body having a face formed with said two orifices, the face of said die body bounding said space.

3. In an apparatus as set forth in claim 1, said two orifices being elongated in respective closed arcs, one of said orifices being enveloped by the arc of the other orifice.

4. In an apparatus as set forth in claim 3, said arcs being substantially circular and concentric.

5. In an apparatus as set forth in claim 1, said orifices being elongated along substantially parallel straight lines.

6. In an apparatus as set forth in claim 1, said feed means and said exhaust means including respective conduits having apertures communicating with said space and interposed between the two orifices of said die means.

7. In an apparatus as set forth in claim 6, said die means including a die body formed with a groove therein, said groove being elongated in said common direction and interposed between said two orifices, one of said conduits being at least partly received in said groove, and the other conduit having an aperture opening into said groove.

8. In an apparatus as set forth in claim 1, means for generating an electric discharge in said space.

9. In an apparatus as set forth in claim 1, said two orifices being elongated in respective closed arcs, one of said orifices being enveloped by the arc of the other orifice, said pressure means thus extruding from said orifices an interior and exterior body, said die means having a face formed with said orifices, means for admitting a fluid pressure medium at said face into the interior of said interior body.

10. In an apparatus as set forth in claim 1, said feed means being uniformly distributed over the elongation of said orifices so that said gas will sweep fully and uniformly across said bodies.

References Cited

UNITED STATES PATENTS

| | | | |
|---|---|---|---|
| 2,091,125 | 8/1937 | Stewart | 18—12 |
| 2,503,518 | 4/1950 | Slaughter | 18—131 X |
| 2,668,324 | 2/1954 | Johnson | 18—14 |
| 2,773,285 | 12/1956 | Piazze et al. | 156—244 |
| 2,844,846 | 7/1958 | Kronholm | 18—14 |
| 2,944,298 | 7/1960 | Bernhardt et al. | 156—244 |
| 3,099,859 | 8/1963 | Eilerson | 18—12 |

WILLIAM J. STEPHENSON, *Primary Examiner.*

EARL M. BERGERT, *Examiner.*

P. DIER, *Assistant Examiner.*